March 17, 1953 J. W. DUHN 2,631,517
HEATER
Filed Aug. 13, 1949 2 SHEETS—SHEET 1
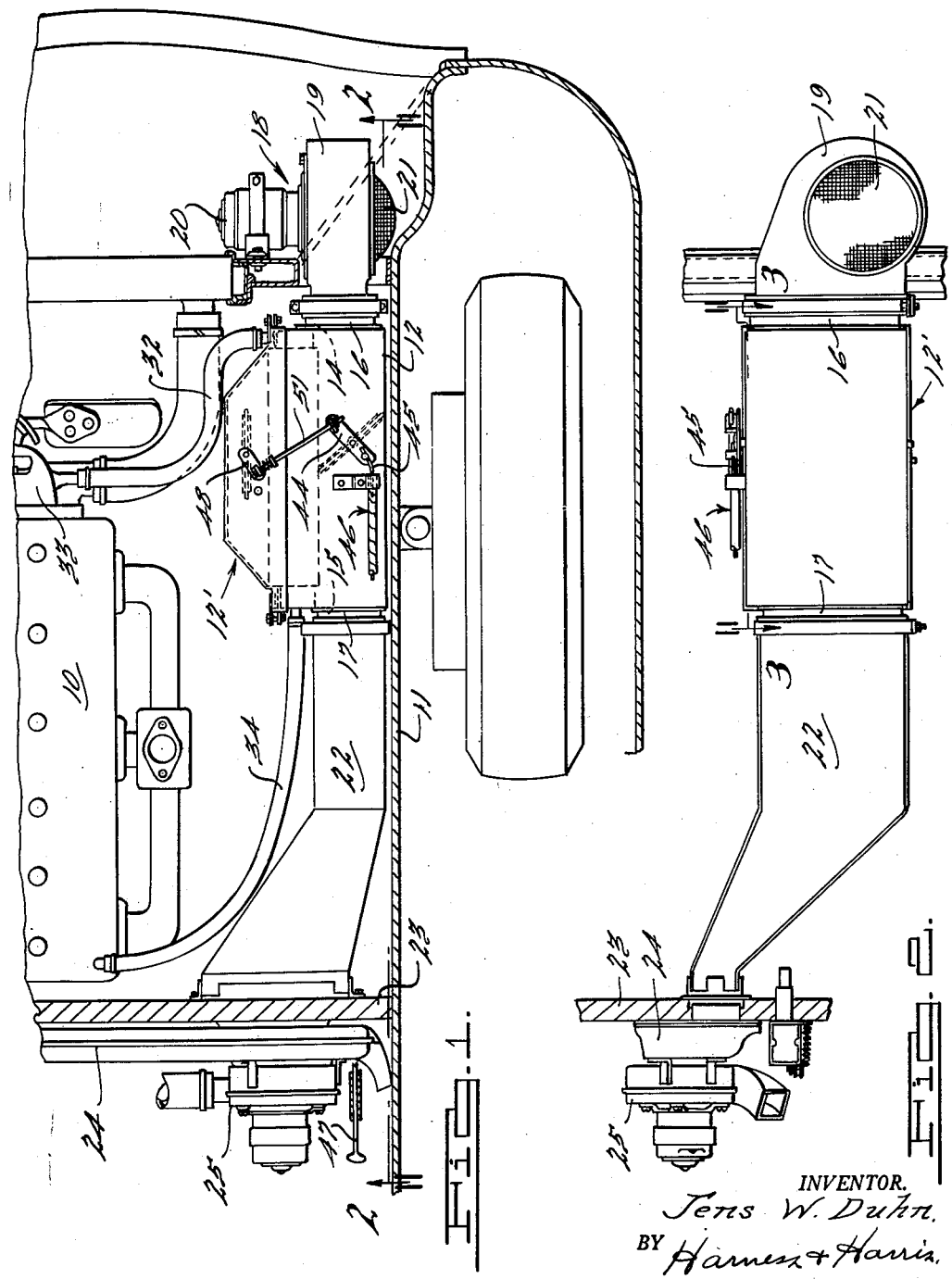
INVENTOR.
Jens W. Duhn,
BY Harness + Harris
ATTORNEYS.

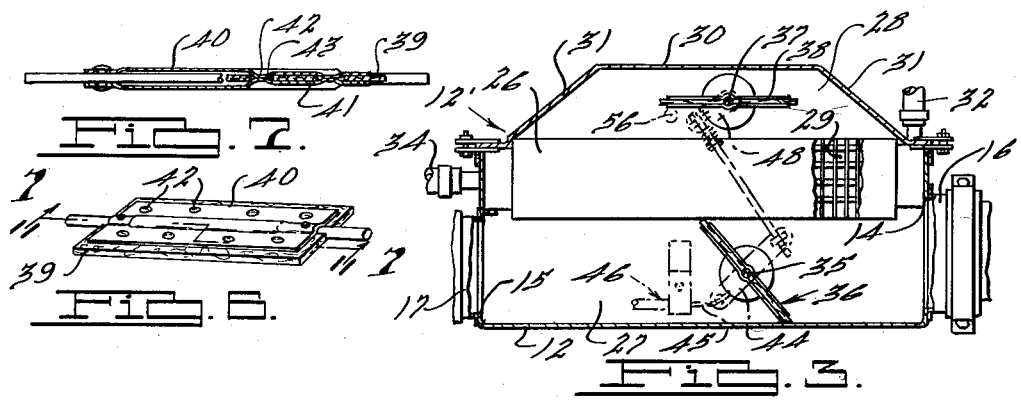

Patented Mar. 17, 1953

2,631,517

UNITED STATES PATENT OFFICE 2,631,517

HEATER

Jens W. Duhn, Pleasant Ridge, Mich., assignor to Chrysler Corporation, Highland Park, Mich., a corporation of Delaware Application August 13, 1949, Serial No. 110,157

7 Claims. (Cl. 98—2)

This invention relates to an improved vehicle heater.

More specifically, the invention pertains to improvements in the control apparatus of a vehicle heater of the fresh air type.

One of the main objects of the invention is to provide in a heater of this character control mechanism for selectively supplying heated and unheated fresh air from the exterior to the interior of the passenger compartment of a vehicle and which may be conditioned to effectively discontinue all air supply through the heating system.

A further object of the invention is to provide control apparatus in a heater of this type by which mixtures of various amounts of heated and unheated fresh air may be supplied to the passenger compartment of a vehicle.

Another object of the invention is to provide air regulating control apparatus in a vehicle heater of this kind which is adapted to be progressively varied in its setting throughout its entire range of adjustments by manipulation of a single manual control element in a single direction.

A further object of the invention is to provide air regulating control apparatus of this character in a vehicle heater of the type in which air to be heated passes more than once through the same heat transfer unit.

Other objects of the invention are to provide a pair of cooperating dampers or valve members in air regulating control apparatus of this kind, to provide mechanism for regulating the dampers simultaneously to and from the full heated and unheated air supplying positions respectively and which is adapted to shift only one of the dampers from its open to its closed position while the other damper remains in its closed position in order to shut off all heated and unheated air supply through the heater to the vehicle passenger compartment, and to provide in the control mechanism a lost motion connection between the two damper members to accommodate shifting of one damper member to closed and open positions while the other damper member remains at rest in its closed position.

An illustrative embodiment of the invention is shown in the accompanying drawings, in which:

Fig. 1 is a fragmentary horizontal sectional view of a vehicle equipped with my improved heater;

Fig. 2 is a fragmentary vertical sectional view of my improved structure taken on line 2—2 of Fig. 1;

Fig. 3 is a fragmentary horizontal sectional view taken on the line 3—3 of Fig. 2, showing the dampers positioned to accommodate the supply of only heated air to the vehicle passenger compartment;

Fig. 4 is a fragmentary sectional view similar to Fig. 3 but showing the dampers arranged to supply only unheated air to the vehicle passenger compartment;

Fig. 5 is a fragmentary sectional view, similar to Figs. 3 and 4 by showing the dampers arranged to obstruct the flow of both heated and unheated fresh air through the heater to the passenger compartment of a vehicle;

Fig. 6 is a perspective view of a damper member representing the construction of both damper members; and Fig. 7 is a longitudinal vertical sectional view taken on line 7—7 of Fig. 6.

Fig. 8 is a fragmentary plan view of the portion of the heater shown in Fig. 1 at which is located the control mechanism showing parts of the control structure somewhat in detail.

In the form of the invention illustrated in the drawings, the improved heater is shown in a vehicle assembly at a location within the engine compartment between the right side of the power unit 10 and the inner wall 11 of the wheel housing. The heating unit, generally designated by the numeral 12', comprises a sheet metal casing 12 having an inlet opening 14 at its right end and an outlet opening 15 at its left end, as viewed in Fig. 1. The inlet and outlet openings 14 and 15 communicate respectively with inlet and outlet sleeves 16 and 17. Mounted on the inlet sleeve 16 is a blower unit generally designated by the numeral 18 comprising a sheet metal casing 19 having a fan (not shown) therein which is adapted to be driven by a motor 20. The blower unit 18 is located inwardly of the inner wall 11 of the wheel housing at the forward end of the vehicle and it is provided with an air inlet that is covered by a screen 21.

The sleeve 17 which communicates with the outlet opening of the heater casing 12 is connected by a sheet metal conduit 22 which extends rearwardly through the dash panel 23 of the vehicle and is connected with a distributing manifold 24 from which heated air is discharged into the passenger compartment of the vehicle. A defroster blower 25 is mounted on the inner side of the dash panel 23 and is connected with the distributing manifold 24 from which it draws heated air and forcefully discharges it through a windshield defroster unit (not shown), upon the windshield of the vehicle.

The interior of the heating unit is divided by a heat transfer unit 26 into a main direct air passageway 27 leading from the inlet opening 14 to the outlet opening 15 of the heater casing 12, and a by-pass passageway 28 which is connected with the direct air passageway 27 by a plurality of passageways 29 extending transversely of the heat exchange unit 26. The vertical wall of the heater casing 12 which is disposed adjacent the engine unit 10 comprises an intermediate panel 30 extending longitudinally of the vehicle and diverging end panel sections 31 which extend diagonally of the vehicle. Provision is made for circulating heated engine cooling medium through the heat exchanger 26 in the manner conventionally used in vehicle hot water heater systems. In the drawings is illustrated an inlet tube 32 which extends from the water pump 33 of the engine unit to the heat exchanger unit. A similar tube 34 returns the medium from the heat exchanger 26 to the rear end of the engine cylinder head.

Pivotally mounted in the upper and lower walls of the heating unit casing 12 is a shaft 35 which extends vertically through the direct air passage 27 of the heater and on which is fixed a valve element or damper generally designated by the numeral 36. A similar shaft 37 extends vertically through the by-pass passageway 28 and is journalled at its opposite ends in the upper and lower walls of the heater unit casing. Mounted on the shaft 37 is a valve element or damper 38. The dampers 36 and 38 are substantially identical in construction and are shown in Figs. 6 and 7. Each damper preferably comprises an intermediate sheet of flexible material 39 which may consist of felt, rubber or any other suitable flexible material. Disposed on opposite sides of the flexible sheet material 39 are sheet metal plates 40 and 41 which are sufficiently smaller in length and width to present exposed marginal portions of the flexible sheet 39 for contact with the walls of the casing 12 of the heating unit and with opposite side surfaces of the heat exchange unit 26. The plates 40 and 41 have inwardly extending depressions 42 which extend through registering apertures 43 in the flexible sheet material 39 and which are spot welded together to form an integral assembly. The flexible sheet material 39 is cut away along the longitudinal central axis of the damper to accommodate reception of the shaft 37 in the case of the damper 38 or the shaft 35 in the case of the damper 36 and the respective shafts are fixed to the plates 40 and 41 by rivets (not shown) or other suitable means.

The upper ends of the shafts 35 and 37 extend outwardly beyond the top wall of the heater unit casing 12 and the exterior end of the shaft 35 is provided with a lever 44 which is fixed to the shaft in any suitable manner. The lever 44 extends in respectively opposite directions from the shaft and one end thereof is operatively connected with a Bowden wire 45 of a manual control unit generally designated by the numeral 46 which, as shown in Fig. 1, extends rearwardly of the vehicle through the dash panel 23 to the interior of the passenger compartment. The rear end of the Bowden wire 45 is provided with an operating handle 47 which may be conveniently manipulated in the manner hereinafter set forth to vary the path of air flow through the heating unit and to shut off such air flow as desired.

The shaft 37 of the by-pass damper 38 also extends upwardly beyond the top wall of the heater casing unit 12 and to which is fixed a lever 48 which extends only in one direction from the shaft. The outer end of the lever 48, as shown in Fig. 8, is provided with an apertured lug 49 which is preferably pivotally attached to the lever 48 and a similar apertured lug 50 is pivotally mounted on the end of the lever 44 opposite from that to which the Bowden wire 45 is connected. The lugs 49 and 50 are connected by a rod 51 having a head 52 engaged against the outer side of the lug 49. The opposite end of the rod 51 is threaded in the apertured lug 50 and locked with respect thereto by a nut 53. A coil spring 54 bears between the inner side of the lug 49 and a spring abutment 55 fixed on the rod 51. The spring 54 is preferably held under a slight initial compression between the lug 49 and the abutment 55. The rod 51 serves as a link for coordinating movement of the dampers under the control of the control apparatus 46. The connection provided between the lever 48 and the rod 51 by the pivotally mounted apertured lug 49 and spring 54 provides for lost motion at certain stages of the operation of the structure as hereinafter more clearly set forth.

In the operation of the control mechanism the dampers may be set, as shown in Fig. 3, to obstruct free flow of air directly through the air passage 27 of the heater and to direct and cause such air to flow through the passages 29 of the heat exchanger 26 into the right end of the by-pass passage 28 through which it is deflected by the right inclined panel section 31, shown in Fig. 3, of the casing 12 toward the left end of the by-pass passageway 28. The left inclined panel section 31 then deflects such air through the passages 29 of the heat exchange unit 26 and into the left end of the direct air passage 27 from which the air flows through the conduit 22 to the interior of the passenger compartment, such air flow being propelled by the blower unit 18. This course of air flow is produced by pulling upon the manual control handle 47 in order to rotate the lever 44 and damper 36 with which it is rigidly connected in a clockwise direction to the position shown in Figs. 1 and 3 in which one protruding edge of the flexible material of the damper sealingly engages the outer vertical side surface of the heat exchange unit 26 and the other edge of the flexible material of the damper sealingly engages the outer vertical wall of the heater casing. Inasmuch as the flexible material of the damper extends beyond the opposite ends of the damper, it also sealingly engages the internal surfaces of the upper and lower walls of the casing 12 and thereby effectively obstructs the direct flow of air from the inlet opening 14 to the outlet opening 15 of the heating unit. Such clockwise movement of the lever 44 rotates the lever 48, shaft 37 and damper 38 in a counterclockwise direction to bring the damper 36 into parallel relationship with respect to the length of the by-pass passage 28. It should be noted that when the damper 36 is in the position shown in Figs. 1 and 3, it is so inclined as to direct incoming air toward the heat exchanger 26 and by-pass passageway 28. A pin 56 may be provided in the by-pass passage 28 for limiting such counterclockwise rotation of the damper 38 in order to retain it in full open position against the action of the compression spring 54.

By pressing inwardly upon the control handle 47 while it is in its rearwardly extended position, the lever 44 of the damper 36 may be rotated in a counterclockwise direction to bring the damper 36 into parallelism with the length of the direct air passage 27 as shown in Fig. 4. Such counterclockwise rotation of the lever 44 simultaneously rotates the damper 38 in a clockwise direction to the position shown in Fig. 4 in which it sealingly obstructs the flow of air through the by-pass passageway 28 in the same manner as described in connection with the operation of the damper 36. Clockwise rotation of the damper 38 during counterclockwise rotation of the damper 36 is produced by the action of the rod 51 and spring 54 which bears between the lug 49 and the spring abutment 55 on the rod 51. When the dampers 36 and 38 are disposed, as illustrated in Fig. 4, air is permitted to flow directly through the direct air passage 27 into the passenger compartment without passing through the heat exchanger unit 26. In this manner fresh, cool air may be forcefully supplied by the blower unit 18 to the passenger compartment when heat is not desired.

The damper 36 may be rotated from its open position, shown in Fig. 4, to a closed position, shown in Fig. 5, of a reverse inclination to its closed position shown in Fig. 3, by pressing further forwardly on the control handle 47. This is accomplished without disturbing the damper 38 in the by-pass passageway 28 which remains closed. During the latter closing action of the damper 36, the spring 54 yields and the rod 30 shifts relative to the apertured lug 49 allowing lost motion between the lever 48 and rod 51. When the damper 36 is in its closed position shown in Fig. 5, it is so inclined as to direct air away from the heat exchange unit 26.

The damper 36 can be moved by the manual control member 47 from its closed position shown in Fig. 3 to a partially open position intermediate the positions shown in Figs. 3 and 4, without completely closing the damper 38. With this setting of the dampers, some fresh outside air flows directly through the passageway 27 to the outlet opening 15 and some of the fresh air passes through the heat exchanger 26 to the by-pass passageway 28, back through the heat exchange unit to the main passageway 27 where the heated and unheated fresh air mix and produce a tempered heated air supply to the passenger compartment and defroster.

With the foregoing heater control system, heated air which has been caused to pass twice through the heat exchange unit 26 may be supplied to the interior of the passenger compartment when desired, or if heat is not wanted and cool, fresh outside air is desired, the dampers may be so disposed as to supply air directly to the passenger compartment and defroster from the air inlet of the system without passing it through the heat exchange unit. If it is desired to shut off all flow of air through the heating system, this may be accomplished by closing both the dampers 36 and 38 in the manner heretofore described. All three settings of the dampers may be selectively made by manipulation of a single control member which is located within the convenient reach of the driver.

Although but one specific embodiment of the invention is herein shown and described, it will be understood that various changes in the sequence of operations, steps and materials employed may be made without departing from the spirit of the invention.

I claim:

1. A heater comprising a casing having inlet and outlet openings and a direct air passageway therethrough from said inlet opening to said outlet opening, a by-pass passageway in said casing spaced from said direct air passageway, a heat exchange unit in said casing between said passageways having air passages communicatively connecting said passageways, a first adjustable damper member in said direct air passageway for obstructing the direct flow of air therethough fom said inlet opening to said outlet opening and deflecting the same though said heat exchange unit and into said by-pass passageway, means for regulating said first damper member to its open and closed positions respectively, a second adjustable damper member in said by-pass passageway for obstructing the flow of said deflected air therethrough from said direct air passageway toward the outlet opening of said casing, and a member inter-connecting said first and second damper members adapted to open and close said second damper member as said first damper member is closed and opened respectively, said inter-connecting member including a lost motion device comprising a resilient element adapted to be compressed when said first damper member is moved to its closed position while said second damper element is in its closed position.

2. A heater comprising a casing having inlet and outlet openings and a direct air passageway therethrough from said inlet opening to said outlet opening, a by-pass passageway in said casing spaced from said direct air passageway, a heat exchange unit in said casing between said passageways having air passages communicatively connecting said pasageways, a first adjustable damper member in said direct air passageway shiftable to one inclined closed position therein for obstructing the direct flow of air therethrough from said inlet opening to said outlet opening and deflecting the same through said heat exchange unit and into said by-pass passageway, said adjustable damper being shiftable to an oppositively inclined closed position, means for regulating said first damper member to its open and closed positions respectively, a second adjustable damper member in said by-pass passageway for obstructing the flow of said deflected air therethrough from said direct air passageway toward the outlet opening of said casing, and a member inter-connecting said first and second damper members adapted to open and close said second damper member as said first damper member is closed and opened respectively, said interconnecting member including a lost motion drive for accommodating movement of said first damper member to its said oppositely inclined closed position while said second damper member is in its closed position, said regulating means including a single manually operable element adapted to shift said first damper member from closed to open and to an oppositively closed position by movement in a single direction.

3. A heater comprising a casing having inlet and outlet openings and a direct air passageway therethrough from said inlet opening to said outlet opening, a by-pass passageway in said casing spaced from said direct air passageway, a heat exchange unit in said casing between said passageways having air passages communicatively connecting said passageways, a first adjustable damper member in said direct air passageway for obstructing the direct flow of air from said inlet opening to said outlet opening, said first damper member being of greater width than the corresponding dimension of said direct air passageway and adapted when closed in one direction to extend diagonally of said direct air passage with the edge thereof adjacent said heat exchange unit spaced further from said inlet opening than is the opposite edge of said damper member so as to deflect air through said heat exchange unit into one end of said by-pass passageway, means for shifting said first damper member to said diagonally closed position, to an open position and to an opposite diagonally closed position at which it directs air away from said heat exchange unit and by-pass passageway, a second damper member pivotally adjustably disposed in said by-pass passageway, and means inter-connecting said damper members adapted to hold said second damper member in open position when said first damper member is in said first mentioned diagonal position and to hold said second damper member closed when said first damper member is in its open and second mentioned diagonal positions.

4. A heater comprising a casing having inlet and outlet openings and a direct air passageway therethrough from said inlet opening to said outlet opening, a bypass passageway in said casing spaced from said direct air passageway, a heat exchange unit in said casing between said passageways having air passages communicatively connecting said passageways, an adjustable damper member pivotally mounted in each of said passageways respectively, a lever secured to each of said damper members respectively, and rotatable therewith, and control mechanism for said damper members including a member interconnecting said levers for simultaneously selectively shifting either one of said damper members to open position and the other to closed position, said interconnecting member being provided with a lost motion device adapted to accommodate shifting one of said damper members to closed position while the other damper is in its closed position.

5. A heater comprising a casing having inlet and outlet openings and a direct air passageway therethrough from said inlet opening to said outlet opening, a bypass passageway in said casing spaced from said direct air passageway, a heat exchange unit in said casing between said passageways having air passages communicatively connecting said passageways, first and second shafts disposed in said direct air passageway and bypass passageway respectively, first and second damper members secured to said first and second shafts operable to obstruct direct air through said passageways, respectively, and means disposed out of said casing and engageable with said shafts for simultaneously rotating said damper members to open and closed positions, said means comprising first and second levers fixed to said first and second shafts respectively, a member connecting the free ends of said levers and a manually operable device operably connected to one of said levers for controlling the movement thereof.

6. A heater comprising a casing having inlet and outlet openings and a direct air passageway therethrough from said inlet opening to said outlet opening, a by-pass passageway in said casing spaced from said direct air passageway, a heat exchange unit in said casing between said passageways having air passages communicatively connecting said passageways, an adjustable damper member in each of said passageways respectively, and control mechanism for said damper members including means inter-connecting them for simultaneously selectively shifting either one of said damper members to open position and the other to closed position, said interconnecting means including a lost motion device adapted to accommodate shifting of one of said damper members to closed position while the other damper is in its closed position, said control mechanism also including a manually operable member connected to one of said dampers for selectively shifting to open position the damper of either of said passageways and simultaneously closing the other damper and for closing both of said dampers, respectively.

7. A heater comprising a casing having inlet and outlet openings and a direct air passageway therethrough from said inlet opening to said outlet opening, a by-pass passageway in said casing spaced from said direct air passageway, a heat exchange unit in said casing between said passageways having air passages communicatively connecting said passageways, a first adjustable damper member in said direct air passageway for obstructing the direct flow of air therethrough from said inlet opening to said outlet opening, said damper when closed having its main body portion disposed diagonally of said direct air passageway for deflecting air through said heat exchange unit and into said by-pass passageway, means for regulating said first damper member to its open and closed positions respectively, a second adjustable damper member in said by-pass passageway for obstructing the flow of said deflected air therethrough from said direct air passageway toward the outlet opening of said casing, and a member interconnecting said first and second damper members adapted to open and close said second damper member as said first damper member is closed and opened respectively, said inter-connecting member including a lost motion device for accommodating movement of said first damper member to its closed position while said second damper member is in its closed position and a manually operable control element operatively connected with one of said damper members and with the other damper member by said inter-connecting member and said last mentioned one of said damper members, said control element being shiftable to different positions for selectively maintaining closed either one of said damper members while the other is open and maintaining both damper members closed at the same time, respectively.

JENS W. DUHN.

REFERENCES CITED

The following references are of record in the file of this patent:

UNITED STATES PATENTS

| Number | Name | Date |
|---|---|---|
| 1,038,402 | MacPhee | Sept. 10, 1912 |
| 1,719,659 | Hopkins | July 2, 1929 |
| 1,785,334 | Black | Dec. 16, 1930 |
| 1,919,625 | Ewald | July 25, 1933 |
| 1,988,945 | Hansen | Jan. 22, 1935 |
| 2,086,076 | Goerg | July 6, 1937 |
| 2,229,304 | Shurtleff | Jan. 21, 1941 |
| 2,383,861 | Hopkins | Aug. 28, 1945 |
| 2,488,278 | Findley | Nov. 15, 1949 |

FOREIGN PATENTS

| Number | Country | Date |
|---|---|---|
| 410,078 | Germany | Apr. 1, 1924 |